J. DICK.
CONVEYER.
APPLICATION FILED MAY 18, 1917.
1,293,050.  Patented Feb. 4, 1919.
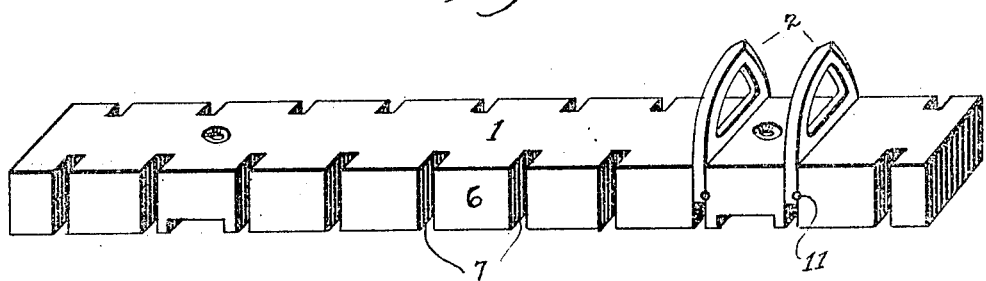
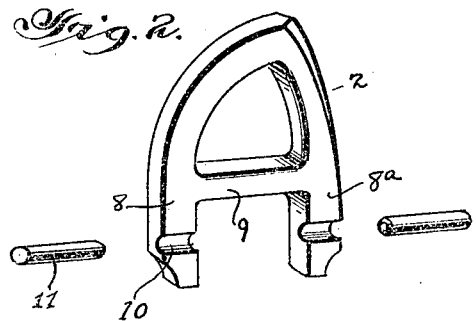
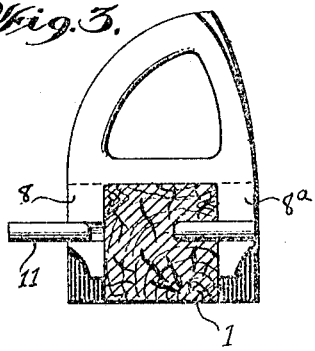
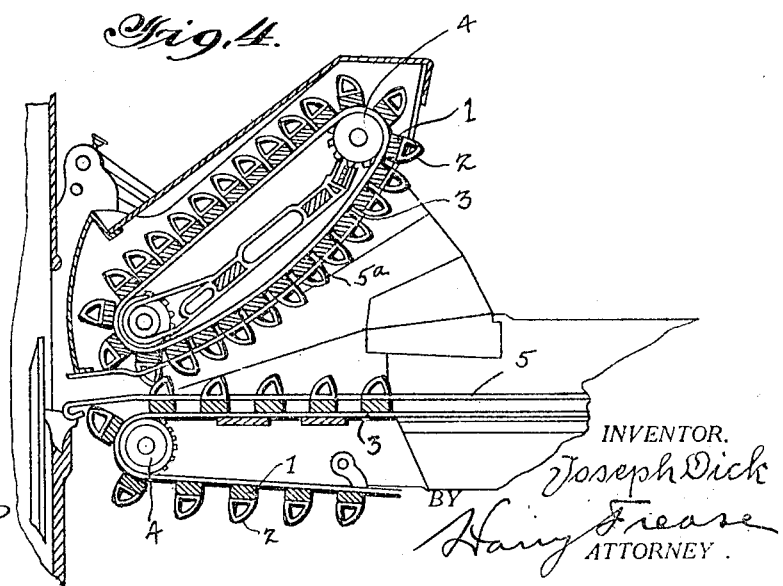
WITNESS:
Ernest Crocker
INVENTOR.
Joseph Dick
BY Harry Frease
ATTORNEY.

UNITED STATES PATENT OFFICE.

JOSEPH DICK, OF CANTON, OHIO, ASSIGNOR TO THE JOSEPH DICK MANUFACTURING COMPANY, OF CANTON, OHIO, A CORPORATION OF OHIO.

CONVEYER.

1,293,050. Specification of Letters Patent. Patented Feb. 4, 1919.

Application filed May 18, 1917. Serial No. 169,442.

*To all whom it may concern:*

Be it known that I, JOSEPH DICK, a citizen of the United States, and resident of Canton, in the county of Stark and State of Ohio, have invented certain new and useful Improvements in Conveyers, of which the following is a specification.

The invention relates to fodder cutter feed conveyers having an endless belt comprising a plurality of spaced cross bars mounted upon a pair of conveyer chains or the like, and having a plurality of substantially V-shaped conveyer teeth secured to the bars; and the object of the improvement is to provide conveyer teeth of simple design and cheap construction which may be readily secured to the cross bars and firmly and rigidly held in place thereon.

In conveyers of this character, the teeth frequently operate in and through longitudinal slots formed in the bottom of the conveyer, and the impelling work of the teeth is performed by the protruding ends thereof, so that great strain is sometimes placed upon the securing means, especially at the rear end of the conveyer where the teeth are withdrawn through the slots, with the result that the teeth are sometimes loosened and torn from the cross bars.

This difficulty is overcome by connecting the legs of the teeth intermediate their ends by tie bars, which not only strengthen the teeth, but rest upon the face of the cross bar and properly position the teeth thereon; and by securing the free ends of the legs in the kerfs or grooves provided therefor in the edges of the cross bar, which may be done by the use of nails or pins interlocking with the sides or legs and the grooves.

A preferred embodiment of the invention is illustrated in the accompanying drawings, in which—

Figure 1 is a perspective view of a cross bar for a conveyer, having two of the improved teeth secured thereto;

Fig. 2, a detached perspective view of a tooth and two of the securing pins;

Fig. 3, a cross section of the cross bar showing a tooth in elevation, with one of the securing pins driven part way into the cross bar and the other securing pin driven full way therein; and Fig. 4, a fragmentary section of a fodder-cutter feed-conveyer showing the use of conveyers embodying the present invention.

Similar numerals refer to similar parts throughout the drawings.

The endless conveyer with which the present invention is concerned, includes a series of cross bars 1 made of wood or the like, having a plurality of V-shaped teeth 2 thereon, and secured to an endless chain or belt 3 which may operate around suitable pulleys 4; and the teeth may protrude through and operate along slots formed between longitudinal bars 5 or 5$^a$ forming the bottom or face of the conveyer.

The side edges 6 of the cross bars 1 are provided with series of cross cut kerfs or grooves 7, the grooves on one side being located directly opposite those on the other side so as to form pairs of grooves for the reception of the free ends of the legs 8 and 8$^a$ of the teeth 2.

The legs 8 and 8$^a$ of each tooth 2 are connected together intermediate their ends by a tie bar 9, which is adapted to bear against the face of the cross bar when the free ends of the legs of the tooth are inserted in the grooves on the sides thereof, thereby properly positioning the tooth upon the cross bar.

Across one side of the free end of each leg of the tooth is preferably provided a half round notch 10, and for positively securing the tooth to the cross bar, full round pins 11 may be driven through these notches into the cross bar; and it is evident that one half of the width of these pins will be driven through the wood at the sides of the grooves, and that the whole of the inner ends of the pins will be driven into the body of the wood inside the grooves; thereby rigidly securing the tooth to the cross bar.

It is evident that by cutting the transverse kerfs or grooves 7 so narrow that the free ends of the legs of the teeth must be driven into the same, the wedging engagement of the legs and the grooves together with the bearing contact of the tie bar upon the face of the cross bar, may be sufficient to hold the tooth in proper position upon the cross bar without other securing means for certain kinds of use; but when the teeth are subject to sudden shocks and severe strains, it is preferred to supplement such frictional engagement by the use of the pins as described or other like securing means.

I claim:—

1. A fodder-cutter feed-conveyer including a cross bar having a series of transverse grooves across the side edges thereof, and V-shaped teeth having their legs connected by tie bars and their free ends secured in the grooves.

2. A fodder-cutter feed-conveyer including a cross bar having a series of transverse grooves across the side edges thereof, and V-shaped teeth having their legs connected by tie bars bearing on the face of the cross bars, and their free ends secured in the grooves.

3. A fodder-cutter feed-conveyer including a cross bar having a series of grooves across the side edges thereof, and V-shaped teeth having the free ends of their legs entered in the grooves and provided with notches across the side thereof, and pins driven through the notches and into the adjacent parts of the cross bar.

JOSEPH DICK.

Copies of this patent may be obtained for five cents each, by addressing the "Commissioner of Patents, Washington, D. C."